Jan. 15, 1963     W. WIESSNER     3,073,225
CAMERA WITH A BUILT-IN EXPOSURE METER
Filed Jan. 12, 1962                    2 Sheets-Sheet 2
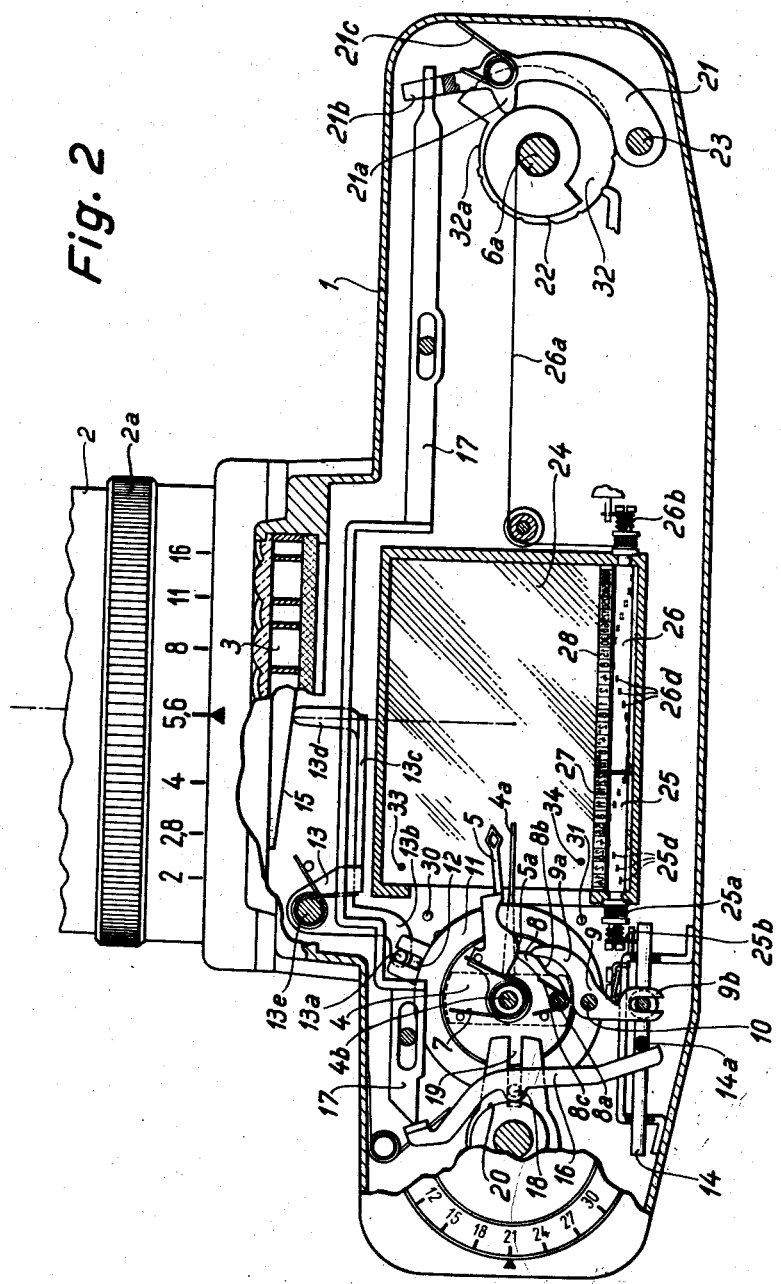
INVENTOR
WILLI WIESSNER
BY Toulmin & Toulmin
Attorneys 
United States Patent Office 3,073,225
Patented Jan. 15, 1963

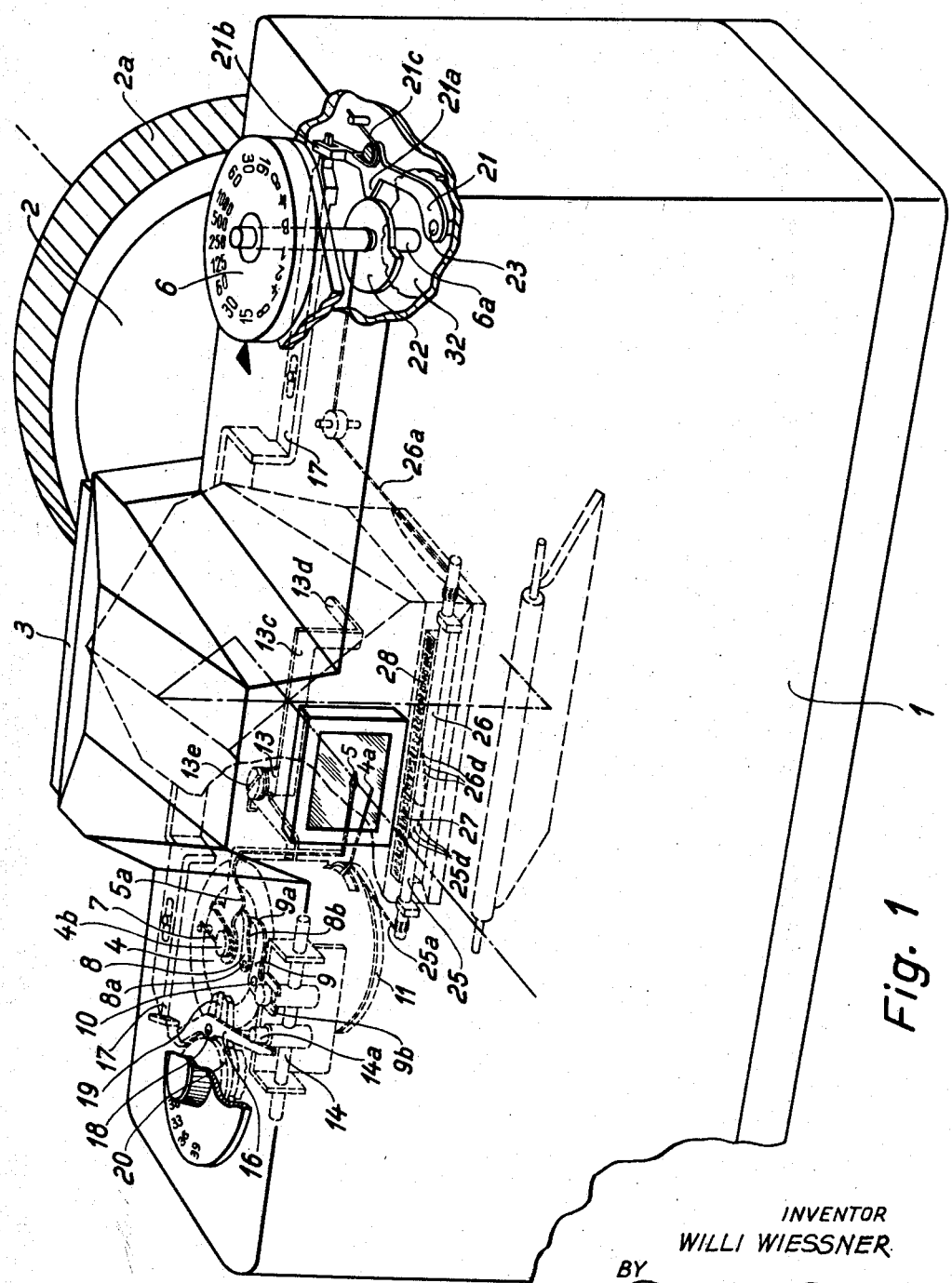

3,073,225
CAMERA WITH A BUILT-IN EXPOSURE METER
Willi Wiessner, Wetzlar (Lahn), Germany, assignor to Ernst Leitz Gesellschaft mit beschrankter Haftung, Wetzlar (Lahn), Germany
Filed Jan. 12, 1962, Ser. No. 165,790
Claims priority, application Germany Jan. 26, 1961
8 Claims. (Cl. 95—10)

The present invention relates to a camera having a built-in photoelectric exposure meter with the meter having follow-up and indicator pointers, more particularly, to the operative connection between the pointers and the exposure time and diaphragm opening adjusting members as well as an indicating system for indicating the numerical values of the exposure time and diaphragm opening in a view-finder.

It is known to provide a differential gear connection between the follow-up pointer of the exposure meter and the exposure time and disphragm opening adjusting members of the camera. Thus, each adjusting member acts through its own system whereby the total effect of the adjusting members determines the position of a final member which, in turn, influences the position of the follow-up pointer.

Such differential gear arrangements have been constructed both as lever and gear differential systems. In both systems, however, the individual elements of the differential system must be adjusted through relatively long displacements in order to effect any appreciable adjustment of the corresponding components of the camera. For this reason those differential gear systems in which the displacement of the members occurs in straight lines, are not suitable for use in smaller-sized cameras.

It is therefore the principal object of the present invention to provide a novel and improved differential gear system for connecting the exposure time and diaphragm opening adjusting members with the follow-up pointer of an exposure meter.

It is a further object of the present invention to provide such a differential gear system wherein a minimum of space is occupied thereby.

The present invention essentially comprises coupling the time exposure adjusting means and the diaphragm opening adjusting means to the follow-up lever of an exposure meter through a lever differential system. In this differential system the coupling member between the exposure time and diaphragm opening adjusting members is formed as a two-armed lever and is pivotally mounted on a disc which is coaxial with the stationary measuring instrument of the exposure meter. One end of this coupling lever is operatively engageable with the follow-up lever of the exposure meter and the other end of the coupling lever is operatively connected to the exposure time adjusting member. The diaphragm opening adjusting member is connected to the rotary disc upon which the coupling lever is mounted.

In addition, indicating means are provided visible through the view-finder for showing the operator the numerical values of the diaphragm opening and the exposure time. The diaphragm opening indicator is connected by a flexible line to the rotatable disc. The time exposure indicator member is directly connected by a flexible line to the time exposure adjusting member.

The invention also comprises a two-armed lever which is operatively connected between one of the adjusting members and the lever differential. This two-armed lever has a movable pivot point which is adjusted by a third adjusting member to compensate for an additional exposure factor.

Other objects and advantages of the invention will be apparent by reference to the accompanying description when taken in conjunction with the following drawings, wherein FIGURE 1 is a rear perspective view of the camera of the present invention with portions thereof removed to show schematically the several components of the invention; and FIGURE 2 is a top plan view of the camera with the top wall removed to show construction details of the invention.

For the description of a specific embodiment of the present invention reference will be made to the accompanying drawings wherein like reference symbols indicate the same parts throughout the various views.

The camera to which the present invention is applied is a reflex camera having a casing 1 from the front wall of which extends an objective 2 having a diaphragm opening adjusting ring 2a. The camera further comprises an exposure meter consisting of a photoelectric cell 3 and a stationary measuring instrument 4 connected thereto. The instrument 4 has an indicator pointer 4a and a follow-up pointer 5 which is coaxially arranged with respect to the indicator pointer 4a.

A torsion spring 7 urges the follow-up pointer 5 in the clockwise direction as viewed in FIGURE 2. One edge of the follow-up pointer 5 is formed as a cam surface 5a to provide a correction surface to compensate for the non-linear response of the measuring instrument.

An intermediate lever 8 has one end pivotally mounted on axis 8a on the stationary casing of the measuring instrument and its other end is engageable with the follow-up pointer cam surface 5a. The intermediate lever is also provided with a cam surface 8b which is engaged by an arm 9a of the coupling lever 9. The coupling lever 9 is in the form of a two-armed lever with its other arm being indicated at 9b and is pivotally mounted at 10 on a rotary disc 11 which is one end of a cylindrical member mounted coaxially with respect to the stationary measuring instrument and rotatable on this axis. The lever 9 is the coupling lever of a differential system whose two input members comprise a slider 14 and the rotary disc 11. The rotary disc and the cylinder of which it is a part enclose the stationary measuring instrument 4.

At a point of the rotatable disc 11 diametrically opposed with respect to the pivot 10 a pair of arms is provided to define a radially extending slot 12 which slidably receives a pin 13a. The pin 13a is fixedly mounted on an arm 13b of an angular lever 13 which is pivotally mounted about an axis 13e. The second arm 13c of the lever 13 is offset and is provided on the end thereof with a lever end 13d which extends in the direction of the optical axis of the camera. The lever end 13d engages an axial cam surface 15 which is rotatably mounted in the objective 2 concentric with respect to the optical axis thereof and fixedly connected with the diaphragm adjusting ring 2a. As a result, manipulation of the diaphragm adjusting ring 2a will pivot the angular lever 13 and accordingly rotate the disc 11.

The exposure time adjusting member is indicated at 6 and is connected with the coupling lever 9 through the lever arm 9b. The arm 9b is drivingly connected through a slot and pin connection with the slider 14 which is slidably mounted in guide members rigidly fixed to the camera casing. The slider 14 is provided with a cam pin 14a which is engaged by one end of another two-armed lever 16 whose other end is engageable with a slidably displaceable rod 17.

The lever 16 is pivoted by a pin 18 in a stationary slot 19 and is engageable by a radial cam surface 20. The cam surface 20 is fixedly connected with an adjusting member for another exposure factor such as the film sensitivity. As a result, rotation of this adjusting factor will displace the pin 18 and accordingly the pivot point of the lever 16. This arrangement enables one to consider the sensitivity of the film or other photographic or exposure factors when manipulating the differential lever system of this camera.

The rod 17 is slidably mounted for linear displacement by means of a pin and slot connection and has one end operatively connected to the exposure time adjusting member 6 by means of a one-armed lever 21, pivotally mounted at 23, and having a cam follower 21a which engages a radial cam 22. The radial cam 22 is fixedly connected to the shaft 6a of the exposure time adjusting member 6. The free end of the lever 21 is indicated at 21b and engages the rod 17. A spring 21c urges the cam follower 21a against the cam surface 22.

The camera is provided with a ground glass plate 24, which may be seen in FIGURE 2, within the limits of which are coaxially mounted in side-by-side relationship two rolls 25 and 26 which are components of the indicator system for showing the operator the numerical values to which the diaphragm opening and exposure time are adjusted. In front of the roll 25 there is positioned a scale 27 having the values of diaphragm openings thereon and the scale 28 is positioned in front of the roll 26 having values of the exposure time or shutter speed thereon.

The roll 25 is connected through a cord or flexible line 25a with the rotatable disc 11 and accordingly the roll 25 rotates as a function of the displacement of this disc.

In a similar manner, the roll 26 is connected through a flexible line 26a with the shaft 6a of the exposure time adjusting member and this roll is similarly rotated as a function of the rotation of the exposure time adjusting member 6.

There are two springs 25b and 26b acting upon the respective rolls 25 and 26 to counterbalance the forces exerted thereon by the cords 25a and 26a.

Each of the rolls 25 and 26 are provided with indicator tabs or projections 25d and 26d which are helically positioned about the respective rolls. Each roll is provided with as many indicator tabs as there are numerical values on the scale corresponding to the respective roll. Thus, the pointing of an indicator tab with one of the values on the scales 27 and 28, respectively, will numerically indicate the value to which the respective adjusting member has been adjusted.

The correct values for the exposure time and the diaphragm opening are obtained when the follow-up pointer 5 coincides with the indicator pointer 4a of the measuring instrument in a known manner. This coincidence is achieved by actuating the adjusting members for the time exposure and the diaphragm opening.

Actuation of the diaphragm opening adjusting ring 2a will rotate the cam 15 and accordingly the lever 13 will be pivoted. As a result, the pin 13a in the slot 12 will rotate the disc a corresponding distance which, in turn, causes a displacement of the pivot point 10 of the coupling lever 9 on a circular arc about the axis of the measuring instrument 4. Since the arm 9b is stationary, but also pivotally connected, the arm 9a, which engages the cam 8b of the intermediate lever 8, is pivoted. The lever 8 is maintained in engagement with the cam 5a by the spring 7. Thus, the follow-up pointer 5 is pivoted as a function of the adjustment of the diaphragm opening adjusting ring 2a.

Rotation of the exposure time adjusting member 6 will produce a simultaneous rotation of the radial cam 22. Assuming that this rotation is counterclockwise as seen in FIGURE 2, then the rod 17 will be displaced by the lever 21 to pivot the lever 16 about its pivot point 18. This pivoting movement will be transferred to the slider 14 through the cam pin 14a so as to pivot the coupling lever 9 about its pivot point 10 which is on the rotatable disc 11. This pivot point 10 is stationary but can be adjusted by the pin slot connection 13a, 12 as described above. This pivoting of the coupling lever 9 effects a corresponding pivoting of the follow-up pointer 5 through the intermediate lever 8. This pivoting of the follow-up pointer 5 is a function of the adjustment of the exposure time adjusting member 6.

When the exposure time adjusting member 6 is adjusted in a clockwise direction as viewed in FIGURE 2, then the lever 21 will be moved against the force of the spring 21a which will cause the lever end 21b to become disengaged from the rod 17 in the event this rod is maintained stationary. However, under the action of the springs 7 and 8c, follow-up pointer 5, intermediate lever 8, slider 14 and lever 16 the rod 17 is maintained in abutting engagement with the lever 21.

Since the operating mechanism coupling the exposure time adjusting member and the diaphragm opening adjusting ring to the follow-up pointer 5 acts simultaneously, the position of the follow-up pointer 5 will always correspond to the measured light value resulting from the individual settings of these two exposure factors.

The measuring range of the exposure meter is so selected that it exceeds the adjusting range of the camera for the lower light values and therefore for the longer exposure times. As a result, exposure times varying from 2 to 15 seconds can be measured by the exposure meter but the camera cannot be adjusted to these times. This limitation occurs because the shaft 6a of the exposure time adjusting member rotates through a larger angle than is required for setting the exposure times ranging from B to 1/1000 seconds. Accordingly, the exposure time setting cam 32, which is mounted on the shaft 6a, has a constant radius cam surface 32a within that portion of the rotary angle which is superfluous for setting the exposure time. Thus, for these longer exposure times the B position of the shutter is always coordinated to this constant radius cam surface 32a.

On the other hand, the radial cam surface 22 extends throughout 360° of the cam so that any rotation of the shaft 6a will produce a corresponding movement in the follow-up pointer 5. In the same manner the indicator roll 26 is also displaced with every adjustment of the exposure time adjusting member 6 and therefore the roll 26 will indicate numerical values of the exposure time or shutter speed also in the range extending from B to 15 seconds. The operator of the camera, however, must bear in mind that the camera shutter cannot be adjusted to these times and that such times must be obtained from an outside source such as by an actual counting by the camera operator.

The ground glass plate 24 is provided with two marks 33 and 34 which mark the range within which the indicator pointer and follow-up pointers may be brought into coincidence to indicate a correct measurement of the exposure factors. In addition, stop pins 30 and 31 are provided as limiting means for the movement of the two pointers. These stop pins 30 and 31 subtend a somewhat greater angle than do the marks 33 and 34.

Thus it can be seen that the present invention provides a differential lever system for coupling exposure time and diaphragm opening adjusting members with the follow-up pointer of an exposure meter which differential system requires a minimum of space and hence can be easily assembled in the limited confines of a small camera.

It will be understood that this invention is susceptible to modification in order to adapt it to different usages and conditions and, accordingly, it is desired to comprehend such modifications within this invention as may fall within the scope of the appended claims.

What is claimed as this invention is:

1. A camera having an adjustable diaphragm and exposure time, and comprising a view-finder, an exposure meter having a stationary measuring instrument with a follow-up pointer and an indicator pointer, said pointers being visible in said view-finder, a rotatable disc coaxial with said measuring instrument, a two-armed lever pivotally mounted on said disc with one end thereof operatively engageable with said follow-up pointer, means for adjusting the diaphragm opening and the exposure time, and means for operatively connecting said one of said diaphragm and time-adjusting means with said disc and for operatively connecting the other to the second arm of said lever.

2. A camera having an adjustable diaphragm and exposure time, and comprising a view-finder, an exposure meter having a stationary measuring instrument with a follow-up pointer having a cam surface thereon and an indicator pointer, said pointers being visible in said view-finder, a rotatable disc coaxial with said measuring instrument, a two-armed lever pivotally mounted on said disc, an intermediate lever having one end pivotally mounted on said stationary measuring instrument and the other end engageable with said follow-up pointer cam surface as a follower, said intermediate lever having a cam surface thereon engageable by one end of said two-armed lever, means for adjusting the diaphragm opening and the exposure time, and means for operatively connecting said one of said diaphragm and time-adjusting means with said disc and for operatively connecting the other to the second arm of said lever.

3. A camera having an adjustable diaphragm and exposure time, and comprising a view-finder, an exposure meter having a stationary measuring instrument with a follow-up pointer and an indicator pointer, said pointers being visible in said view-finder, a rotatable disc coaxial with said measuring instrument, a two-armed lever pivotally mounted on said disc with one end thereof operatively engageable with said follow-up pointer, means for adjusting the diaphragm opening and the exposure time, an adjusting member for a further exposure factor, means for operatively connecting said one of said diaphragm and time-adjusting means with said disc and for operatively connecting the other to the second arm of said lever, said means including a two-armed lever having its pivot point mounted on said adjusting member so as to be adjustable thereby in one of said operative connecting means.

4. A camera having an adjustable diaphragm and exposure time, and comprising a view-finder, an exposure meter having a stationary measuring instrument with a follow-up pointer and an indicator pointer, said pointers being visible in said view-finder, a rotatable disc coaxial with said measuring instrument, a two-armed lever pivotally mounted on said disc with one end thereof operatively engageable with said follow-up pointer, means for adjusting the diaphragm opening and the exposure time, means for operatively connecting said diaphragm adjusting means with said rotatable disc and for operatively connecting said time exposure adjusting means to the second arm of said lever, a first scale for diaphragm openings and a second scale for time exposures with both scales being visible in said view-finder, first and second rotatable rolls cooperating with said scales respectively and having indicators thereon, said first roll being operatively connected with said disc and said second roll being operatively connected with said time exposure adjusting means.

5. A camera having an adjustable diaphragm and exposure time, and comprising a view-finder, an exposure meter having a stationary measuring instrument with a follow-up pointer and an indicator pointer, said pointers being visible in said view-finder, a rotatable disc coaxial with said measuring instrument, a two-armed lever pivotally mounted on said disc with one end thereof operatively engageable with said follow-up pointer, means for adjusting the diaphragm opening and the exposure time, means for operatively connecting said diaphragm adjusting means with said rotatable disc and for operatively connecting said time exposure adjusting means to the second arm of said lever, a first scale for diaphragm openings and a second scale for time exposures with both scales being visible in said view-finder, first and second rotatable rolls cooperating with said scales respectively and having indicators thereon, a first flexible line operatively connecting said first roll with said rotatable disc and a second flexible line operatively connecting said second roll to said time exposure adjusting means, and first and second springs biasing said rolls respectively against the forces exerted thereon by said flexible lines.

6. A camera having an adjustable diaphragm and exposure time, and comprising a view-finder, an exposure meter having a stationary measuring instrument with a follow-up pointer and an indicator pointer, said pointers being visible in said view-finder, a rotatable disc coaxial with said measuring instrument, a two-armed lever pivotally mounted on said disc with one end thereof operatively engageable with said follow-up pointer, means for adjusting the diaphragm opening and the exposure time, means for operatively connecting said diaphragm adjusting means with said rotatable disc and for operatively connecting said time exposure adjusting means to the second arm of said lever, a first scale for diaphragm openings and a second scale for time exposures with both scales being visible in said view-finder, first and second rotatable rolls cooperating with said scales respectively and having indicators thereon said first roll being operatively connected with said disc and said second roll being operatively connected with said time exposure adjusting means, said exposure time adjusting means having a greater range of adjustment with respect to long exposure times than the camera, and means associated with said exposure time adjusting means for adjusting the camera shutter to B beyond the range of exposure values to which the camera can be adjusted.

7. A camera as claimed in claim 6 wherein said last-mentioned means comprises a radial cam having a constant radius.

8. A camera having an adjustable diaphragm and exposure time, and comprising a view-finder, an exposure meter having a stationary measuring instrument with a follow-up pointer and an indicator pointer, said pointers being visible in said view-finder, a rotatable disc coaxial with said measuring instrument, a two-armed lever pivotally mounted on said disc with one end thereof operatively engageable with said follow-up pointer, means for adjusting the diaphragm opening and the exposure time, means for operatively connecting said diaphragm adjusting means with said rotatable disc and for operatively connecting said time exposure adjusting means to the second arm of said lever, a first scale for diaphragm openings and a second scale for time exposures with both scales being visible in said view-finder, first and second rotatable rolls cooperating with said scales respectively and having indicators thereon, said first roll being operatively connected with said disc and said second roll being operatively connected with said time exposure adjusting means, said second time exposure scale for said second roll having values thereon beyond those to which the camera can be adjusted so that such values must be counted by the operator.

References Cited in the file of this patent

UNITED STATES PATENTS

| | | |
|---|---|---|
| 2,932,242 | Greger | Apr. 12, 1960 |
| 2,952,194 | Goshima | Sept. 13, 1960 |
| 2,960,921 | Greger | Nov. 22, 1960 |
| 3,025,777 | Wilkenson | Mar. 20, 1962 |